3,083,218
PREPARATION OF ALUMINUM ALCOHOLATES
FROM NON-ANHYDROUS LOWER ALCOHOLS
Edgar S. Hammerberg, Chicago, Ill., assignor, by mesne
assignments, to Armour and Company, Chicago, Ill., a
corporation of Delaware
No Drawing. Filed Feb. 15, 1960, Ser. No. 8,506
2 Claims. (Cl. 260—448)

This invention relates to an improved process for the preparation of aluminum alcoholates. More particularly, the invention relates to an improved method of carrying out the reaction between aluminum and low molecular weight alcohols to provide alcoholates or alkoxides which are the subject matter of this invention.

This application is a continuation-in-part of my previous application U. S. Serial Number 609,781, filed Sept. 13, 1956, and now abandoned.

Compounds having the formula $Al(OR)_3$ wherein R represents a low molecular weight straight or branched aliphatic hydrocarbon chain, are white solids which are useful reagents in the selective reduction of the carbonyl group of aldehydes and ketones in accordance with the Meerwein-Ponndorf-Verley method. These compounds are generally prepared by reacting aluminum powder with an absolute alcohol, essentially anhydrous, using small amounts of substances such as mercuric chloride or iodine as catalysts.

A source of difficulty in carrying out the above reaction has been the need to employ anhydrous or absolute alcohol and further to use special precautions to exclude moisture from the reaction vessel. Although the cost of producing aluminum alcoholates has been increased considerably because of the special drying procedures, it has previously been thought that such drying procedures were essential in order to avoid decomposition of the end product by contact with any water which might enter the system.

It is an object of the present invention to provide a process which avoids the necessity of using anhydrous starting materials. It is a further object of the invention to provide a process which makes it unnecessary to use any special precaution for excluding moisture from the reaction vessel. Further objects and advantages of the invention will appear as the specification proceeds.

The present invention involves a process for the preparation of an aluminum alcoholate comprising reacting aluminum and an aqueous low molecular weight alcohol in the presence of aluminum chloride.

It has been found that in the presence of the aluminum chloride, the reaction between aluminum and aqueous alcohol progresses very smoothly to completion within a relatively short time, without the need for special pretreatment to render the alcohol anhydrous, or the need for observing special precautions against introducing moisture during the moisture period.

The alcohol used as one of the starting materials in the process of the invention may be any alcohol containing a low molecular weight straight or branched aliphatic hydrocarbon chain. An alcohol especially suited for the reaction is isopropyl alcohol, but other members of the group, such as propyl, butyl, etc., alcohols may be used. The alcohols contemplated by the present invention of course are those which have not been pretreated to remove moisture. Alcohols containing up to about 10% water are suitable starting materials in this process.

The other reactant may be the element aluminum in any of its usual physical forms, such as aluminum powder, ribbon, foil, chips, and pellets.

The reaction between aluminum and alcohol proceeds according to the following equation:

$$2Al + 6ROH \rightarrow 2Al(OR)_3 + 3H_2$$

wherein R is as above defined.

In carrying out the reaction, the aluminum chloride and the metallic aluminum are placed in a reaction zone together with a small quantity of catalysts, preferably a mercury catalyst, such as mercuric acetate. The order of addition is of no particular significance, since the reaction does not progress until the reaction mixture is heated to a reflux temperature. After a reflux temperature has been obtained, the heat source is removed and the reaction allowed to proceed to completion. If the reaction is too vigorous it may be controlled by intermittent cooling of the vessel. The reaction requires from about one-half hour to one hour for completion which is indicated by the termination of hydrogen liberation.

The proportions of reactants should be such that at least 3 moles of alcohol are added for each mole of aluminum, and preferably an excess of alcohol should be used, which can be readily removed by distillation after completion of the reaction. It has been found that the objects of the invention can be achieved by adding the aluminum chloride in concentrations of about 0.3% to 3.0% by weight on the basis of the weight of alcohol used. A concentration of 1% aluminum chloride on the above basis has been found especially suitable. If the aqueous low molecular weight alcohol contains higher than normal amounts of water, such as around 3%, then higher percentages of aluminum chloride should be used.

Although this procedure for using aqueous alcohol is operable even though the alcohol contains as much as about 10% water, probably no economic advantage is gained under such conditions because aof the high levels of aluminum chloride necessary to allow the reaction to proceed smoothly. I prefer to use alcohol containing no more than about 0.1 to 3% water. But the preferable range is based solely on economic considerations; if use of $AlCl_3$ is cheaper than cost of dehydration, the $AlCl_3$ procedure is preferred.

The invention may be more fully illustrated by the following examples:

*Example 1*

Twenty-seven grams of aluminum powder were placed in a reaction vessel and 0.5 gm. of mercuric acetate added. To this was added 300 gms. of 99% isopropyl alcohol and 4 gms. of anhydrous aluminum chloride. The mixture was heated to reflux temperature (82° C.), the heating was then terminated, and the reaction was allowed to proceed to completion, with the intermittent application of cooling when the reaction became too vigorous. At the end of 35 minutes, no further hydrogen was being given off, and the reaction mixture was then distilled in vacuo. The resulting compound, having the formula $Al[OCH(CH_3)_2]_3$, was a white solid possessing a melting point of 118° C.

*Example 2*

The following ingredients were charged into a flask fitted with reflux condenser and heating mantle:

|  | Grams |
|---|---|
| Mercuric acetate | 0.5 |
| Aluminum chloride | 1.0 |
| n-Propyl alcohol | 300.0 |
| Aluminum powder | 27.0 |

The heating mantle was turned on and the temperature of the reaction mixture raised to 45° C. At this point hydrogen was being evolved vigorously, and the heating mantle was removed and the flask cooled in a water bath. Hydrogen continued to come off vigorously, and the reaction was controlled by continuous cooling. 95 minutes later, the temperature was 56° C., and the hydrogen was coming off very slowly. At this point, the heating mantle was replaced around the flask and the flask heated until alcohol was refluxing. Fifteen minutes later the reaction was completed, and the batch was cooled. The resulting product was a white solid having the formula $$Al(O-CH_2-CH_2-CH_3)_3$$

*Example 3*

The following ingredients were charged to a 1 liter flask fitted with reflux condenser and heating mantle:

| | Grams |
|---|---|
| Mercuric acetate | 0.5 |
| Aluminum chloride | 1.0 |
| n-Butyl alcohol | 300.0 |
| Aluminum powder | 27.0 |

The heating mantle was turned on and the temperature raised to 50° C., at which point hydrogen was coming off vigorously. The heating mantle was removed and the flask was cooled continuously for 20 minutes. Hydrogen evolution during this time was vigorous. At the end of the 20 minutes, the temperature was 70° C., and the hydrogen was coming off slowly. After another 20 minutes, the heating mantle was again turned on and the batch refluxed. At the end of the third 20-minute period the heating mantle was removed and the batch cooled. The resulting product was a white solid having the formula $Al(OCH_2-CH_2-CH_2-CH_3)_3$.

*Example 4*

The following ingredients were charged in a 500 cc. round bottom flask fitted with a reflux condenser.

| | Grams |
|---|---|
| Isopropanol | 294 |
| Water | 6 |
| Aluminum | 27 |
| Aluminum chloride (anhydrous) | 4 |
| Mercuric acetate | 0.5 |

The batch was heated to refluxing temperatures for 15 minutes. No reaction resulted. The batch was cooled and 1 gm. increments of aluminum chloride were added until reaction proceeded normally. The reaction took place with the 98% alcohol when a total of 8 gms. of aluminum chloride were added.

*Example 5*

The following ingredients were charged into a 500 cc. RB flask fitted with a reflux condenser.

| | Grams |
|---|---|
| Isopropanol | 291 |
| Water | 9 |
| Aluminum | 27 |
| Aluminum chloride (anhydrous) | 11 |
| Mercuric acetate | 0.5 |

The batch was heated to reflux temperature for 15 minutes without reaction occurring. After cooling and addition of 1 gm. aluminum chloride, the batch was slightly warmed to start the reaction proceeding smoothly.

While in the foregoing specification this invention has been described in relation to certain specific embodiments thereof and details have been set forth for the purpose of illustration, it will be apparent to those skilled in the art that the invention is susceptible of other embodiments and many of the details set forth herein can be varied considerably without departing from the basic concept of the invention.

I claim:

1. In the process for producing an aluminum alcoholate wherein aluminum is reacted with a low molecular weight alcohol in the presence of a mercury catalyst, the improvement comprising the addition of about 0.3 to 3.0% by weight of said alcohol of aluminum chloride, whereby the necessity of using anhydrous alcohol and aluminum under anhydrous reaction conditions is obviated.

2. In the process of producing an aluminum alcoholate wherein aluminum is reacted under reflux conditions with at least 3 moles of a low molecular weight alcohol in the presence of a mercury catalyst, the improvement comprising the addition of about 1% by weight of said alcohol of aluminum chloride whereby the necessity of using anhydrous alcohol and aluminum under anhydrous reaction conditions is obviated.

References Cited in the file of this patent

UNITED STATES PATENTS

| 1,647,446 | Wolcott | Nov. 1, 1927 |
| 2,636,865 | Kimberlin | Apr. 28, 1953 |
| 2,845,447 | Carlson et al. | July 29, 1958 |